United States Patent
Burlitskiy

(10) Patent No.: US 11,799,866 B2
(45) Date of Patent: Oct. 24, 2023

(54) METHOD AND SYSTEM OF MULTI-CHANNEL USER AUTHORIZATION

(71) Applicant: Aleksey Vladimirovich Burlitskiy, Tyumen (RU)

(72) Inventor: Aleksey Vladimirovich Burlitskiy, Tyumen (RU)

( * ) Notice: Subject to any disclaimer, the term of this patent is extended or adjusted under 35 U.S.C. 154(b) by 208 days.

(21) Appl. No.: 17/276,835

(22) PCT Filed: Sep. 18, 2018

(86) PCT No.: PCT/RU2018/000611
§ 371 (c)(1),
(2) Date: Mar. 17, 2021

(87) PCT Pub. No.: WO2020/060432
PCT Pub. Date: Mar. 26, 2020

(65) Prior Publication Data
US 2022/0038463 A1 Feb. 3, 2022

(51) Int. Cl.
*H04L 9/40* (2022.01)
*G06F 21/43* (2013.01)

(52) U.S. Cl.
CPC ........... *H04L 63/102* (2013.01); *G06F 21/43* (2013.01); *H04L 63/0428* (2013.01); *H04L 63/18* (2013.01)

(58) Field of Classification Search
None
See application file for complete search history.

(56) References Cited

U.S. PATENT DOCUMENTS

| 11,164,254 | B1* | 11/2021 | Gordon, III | ....... G06Q 20/0658 |
| 2009/0119754 | A1* | 5/2009 | Schubert | ............ H04W 12/062 726/4 |
| 2015/0172292 | A1* | 6/2015 | Kuang | ............... H04L 63/0884 713/155 |
| 2016/0292412 | A1* | 10/2016 | Stoner | ................. H04L 63/0876 |
| 2016/0300054 | A1* | 10/2016 | Turgeman | ............... G06F 21/36 |
| 2021/0058970 | A1* | 2/2021 | Kwak | .................... H04W 76/27 |
| 2021/0234767 | A1* | 7/2021 | Ricci | .................... G06F 3/0488 |

* cited by examiner

*Primary Examiner* — Kaveh Abrishamkar

(57) ABSTRACT

The present disclosure relates to a system and methods for providing user authorization via a computer network, particularly, by using mobile authorization, wherein a user can be granted access in a variety of mobile channels. The preferred embodiment of the claimed disclosure presents a user authorization system comprising a user device associated with a data source via a data channel, while the data source is associated with an authentication system, in which there are:

the user device configured to form an authorization request to the data source via at least one mobile channel associated with said device;

the data source configured to receive the user authorization request and transmit the corresponding request to the authentication system; and the authentication system providing user authorization on said resource via at least one mobile channel associated with the user device.

13 Claims, 12 Drawing Sheets

METHOD AND SYSTEM OF MULTI-CHANNEL USER AUTHORIZATION

PRIOR ART

The present disclosure relates to a system and methods for providing user authorization via a computer network, particularly, by using mobile authorization, wherein a user can be granted access in a variety of mobile channels.

BACKGROUND

The existing problem is that a user has to remember their usernames and passwords for many various data sources, and resources' expenses to support users and to recover usernames/passwords are quite high within the implementation of various business systems and products. Moreover, any further user actions to remember or recover passwords lead to a decrease in the use of program products, especially when it comes to life/work non-critical ones, such as service or e-commerce applications.

Various implementations of security algorithms with different protection degrees, which solve the problem of having to remember or recover usernames/passwords, are present and well known. From storing login data in browsers and from authenticating through third-party services (such as through Google or Facebook, VK, Single SignOn (SSO) solutions) to individual applications acting as "safes of passwords." Some of these methods also collect user data, and users often do not appreciate it. Other known implementations to solve this problem include methods that require the installation of additional software developed and are either controlled by a third party (e.g. Google Authenticator or one of many similar ones), or require expensive technical operations (e.g. sending a text/email message with a confirmation code, or etc.). Moreover, these security methods require a lot of further user actions, which is undesirable for fast and verifiable business operations, especially in the case of the above non-critical software, such as service or e-commerce applications.

Another problem is that the above existing implementation methods are very different from each other, depending on the form factors and methods of delivering the required data to the user. For example, among a desktop web browser, desktop application, mobile application, mobile web browser, or other delivery form factors.

Thus, each user has to know different authentication methods and remember which specific method is used for a particular data source (i.e. software being accessed), which again decreases the usefulness of a data source, since if a user forgets how to log in, they often stop using this data source.

There are also known solutions based on authorization using OAuth (Open Authorization). It is a non-proprietary authorization protocol that allows granting a third party limited access to protected user resources without the need to disclose their username and password to the third party. Said solutions, for example, are disclosed in such sources as US 20160028737, US20160330199, WO2014130141.

The disadvantage of the existing approaches is the lack of providing multi-channel user authorization via mobile channels that can be assigned by a user themselves to interact with one or many data sources interacting within the framework of a multi-channel platform (system). Besides, the disadvantage is that a usually an inherent authorization method is used for each type of form factor, which increases the labor for deploying authentication processes in general, and in particular—time to perform the necessary actions for authorization.

SUMMARY

The present disclosure uses only technologies already installed in the technical perimeter of a user (e.g. on their mobile device) and solves the same tasks that all the above approaches strive to solve, with at least similar level of security and with the minimum number of user actions, which in overall dramatically simplifies the process of user authorization at a data source.

The present disclosure enables a user to employ fewer authentication methods for various form factors of data access, i.e. a user can always employ the same mobile authentication method for all form factors from where data is accessed, as well as assign a preferred authorization method for various data sources. The claimed disclosure also enables using different access channels for a given data sources.

The authorization mechanism of the present disclosure may be either part of the "first" authentication factor for accessing data directly from a mobile device or the "second" authentication factor (i.e. 2FA), wherein data on one device are accessed through another mobile device or the same device, but from a different authentication channel. Said mechanism can also function as a hybrid of the first and second authentication factors on the same or different form factors, in cases where the authorization of the first factor failed or required further proof (the second factor) from another authentication channel.

The above authorization channels may include, for example, an icon on the screen of a mobile device (installed or in the form of a PWA, with or without permission for push notifications), mobile instant messaging services (messengers or bots in messengers), SMS, email, VOIP systems, QR codes, or other channels.

The preferred embodiment of the claimed disclosure presents a user authorization system comprising a user device associated with a data source via a data channel, while the data source is associated with an authentication system, in which there are:
the user device configured to form an authorization request to the data source via at least one mobile channel associated with said device;
the data source configured to receive the user authorization request and transmit the corresponding request to the authentication system; and
the authentication system providing user authorization on said resource via at least one mobile channel associated with the user device.

In a particular embodiment, the mobile channel is a software application or a graphical user interface element.

In another particular embodiment, the application is a messenger.

In another particular embodiment, the authentication system comprises data on available authorization channels for each data source.

In another particular embodiment, the authentication system stores user authorization data for each available mobile channel.

In another particular embodiment, the authorization request contains at least information identifying the user.

In another particular embodiment, the authorization request contains access data for the selected mobile channel.

In another particular embodiment, the authorization request is encrypted on the user device and decrypted in the authentication system.

In another particular embodiment, the authentication system further sends an authorization confirmation request to a mobile channel of the device.

In another particular embodiment, the authentication system authorizes the user on the resource, based on a response received from the mobile channel of the user device.

In another particular embodiment, when received the authorization request from the user device, the authentication system checks available mobile channels for this user.

In another particular embodiment, the authentication system prioritizes the mobile user authorization channels.

In another particular embodiment, the authentication system forms a request to a mobile user channel of the highest priority.

In another particular embodiment, the user is authorized by using further verification.

In another particular embodiment, further verification may be biometric verification, a PIN code, graphic code, sound code, or a combination of them.

In another particular embodiment, the data channel is selected from the Internet, Intranet, LAN, Ethernet, TCP/IP, WAN, WLAN, MAN, CAN, SAN, PAN, Wi-Fi, Wi-Fi Direct, LPWAN, GSM, GPRS, LTE, 5G, Bluetooth, BLE, IrDA, NFC, satellite communication, or a combination of them.

In another particular embodiment, the data source is a website or a software application.

In another particular embodiment, the user device is a personal computer, smartphone, laptop, tablet, game console, or smart wearable device.

In another particular embodiment, the smart wearable device is selected from the group: a smart watch, smart bracelet, smart ring, augmented reality device, mixed reality device, virtual reality device.

Another preferred embodiment of the claimed disclosure is a method for authorizing a user on a data source via a data channel, comprising the following steps:
forming a resource access request by using a user device, which contains user authorization data, while making the request from an available mobile channel on said user device;
transferring said resource access request to an authentication system associated with said resource;
comparing the user authorization data from the received request for the selected mobile channel to the access data stored in the authentication system by using the authentication system; and
providing authorization of said user on said resource via said mobile channel in case of successful verification of the user request.

In one of the particular embodiments, the user authorization data include at least a user ID on the data source in the selected mobile channel.

In another particular embodiment, the authorization request is encrypted on the user device.

In another particular embodiment, the authentication system stores available mobile authorization channels for each resource.

In another particular embodiment, at least one mobile channel for authorization on the resource is set for each user in the authentication system.

One more preferred embodiment of the claimed disclosure is a method for authorizing a user on a data source via a data channel, comprising the following steps:
forming a resource access request by using a user device, which contains user authorization data;
transferring said resource access request to an authentication system associated with said resource;
checking the availability of one or more mobile authorization channels for said user in the authentication system by comparing the user authorization data to the data stored in the authentication system;
sending an access confirmation request to at least one available mobile authorization channel to the user;
confirming access via the mobile channel on the user device, which received the request from the authentication system, or receiving a negative confirmation of an unauthorized access in said mobile channel; and
authorizing the user on said resource in case of successful confirmation of the access request or denying access in case of a negative confirmation of the access request.

In another particular embodiment, when processing a user authorization request, the authentication system prioritizes the available mobile user authorization channels.

In another particular embodiment, the authentication system sends an access confirmation request to a mobile user channel of the highest priority.

In another particular embodiment, a confirmation policy for mobile channel is used for the access confirmation request.

In another particular embodiment, the confirmation policy is selected from the group: time interval, message receipt confirmation.

In another particular embodiment, based on the channel priority, the authentication system forms a repeated request to another available mobile authorization channel if the set confirmation policy is not fulfilled.

DETAILED DESCRIPTION OF THE INVENTION

Figure 1:
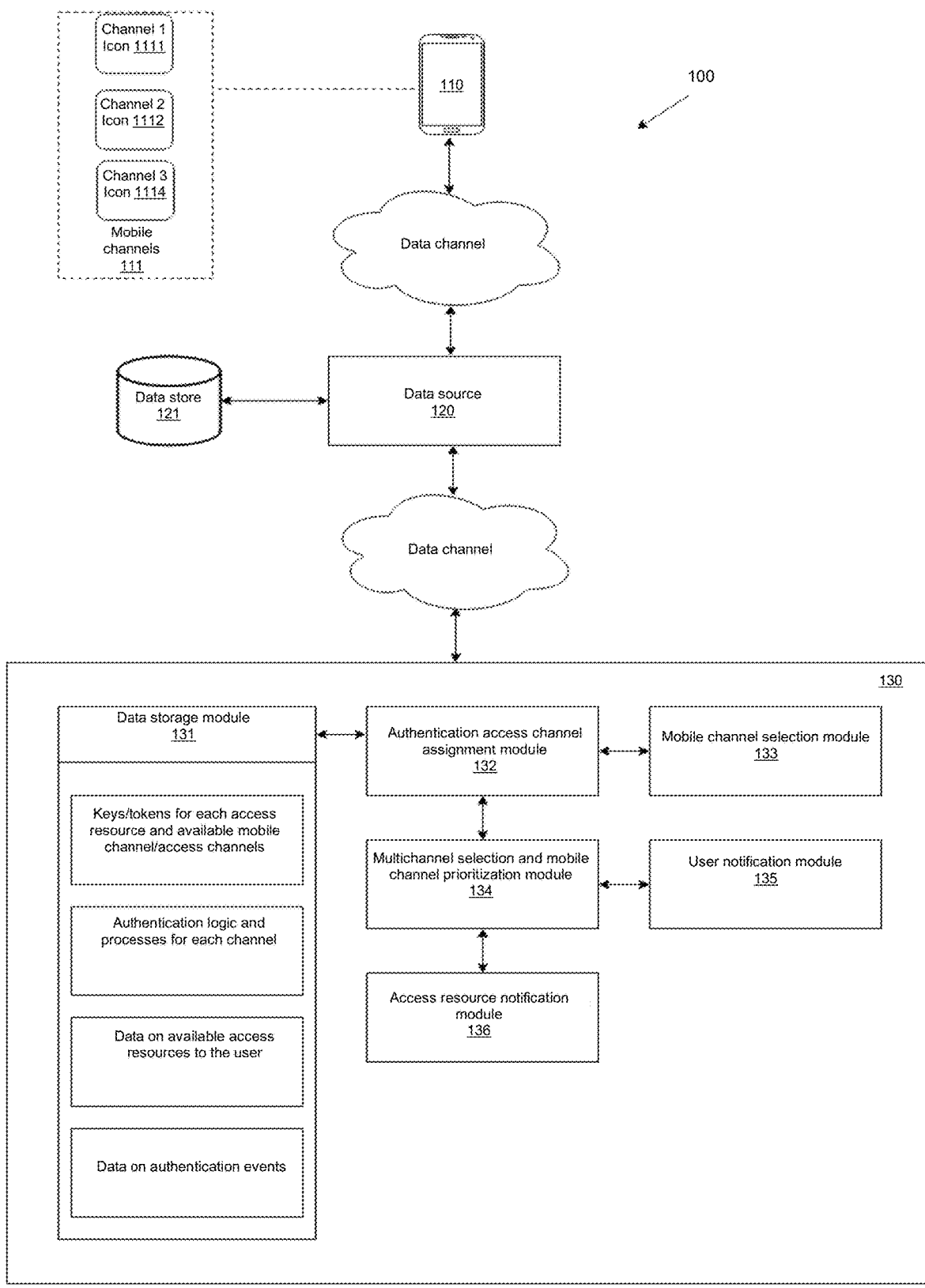
FIG. 1 illustrates the general scheme of operation of the claimed disclosure.

FIG. 1 shows a general system (100) of interaction between the elements of the claimed disclosure. A user is authorized on a data source (120) by means of a user computing device (110) that interacts with the data source (120) via a data channel. The data source (120) is connected to an authentication system (130) that processes data for user authorization, via an appropriate data channel.

The user computing device (110) may be, for example, a smartphone, tablet, personal computer, laptop, game console, smart TV, wearable smart device (ring, bracelet, watch, glasses, etc.), virtual reality device, augmented reality device, mixed reality device, etc. The user computing device (110) must provide that the necessary software logic is processed to perform a user authorization procedure on one or more resources (120). A general description of the main components of the user device (110) will be disclosed below herein.

The data channel may use various principles and protocols for transmitting information and providing information interaction, e.g. the Internet, Intranet, LAN, Ethernet, TCP/IP, WAN, WLAN, MAN, CAN, SAN, PAN, Wi-Fi, Wi-Fi Direct, LPWAN, GSM, GPRS, LTE, 5G, Bluetooth, BLE, IrDA, NFC, satellite communication, etc. Various implementations and embodiments of the data channel depend on the specific implementation of the information exchange network. It is also worth noting that the data channel may be a direct connection of two or more devices to each other.

The data source (120) refers to an entity (object, application, device, website, etc.) that a user accesses via a data channel, and in the most common case, it is a website. In this embodiment of the present disclosure, the data source (120) means not only data, e.g. accounting data, media data, access information, but also a mechanism for their delivery, e.g. a web browser window, mobile application, graphical user interface elements. The data source (120) may also be an application installed on the user device (110).

The data source (120) may also contain a data store (121), such as a database. The data store (121) is a mechanism that is associated with the data source (120) and "recognizes" previously authenticated user devices (110) upon receiving an access request from a user device (110) to speed up the next authentication process. This mechanism may use, for example, cookies for the resource (120) in a browser, or in another technical form that allows accomplishing the task.

The authentication system (130) is a software and hardware solution for providing multi-channel access control for authorization of user devices (110). The authentication system (130) can be integrated into the data source (120), and the integration may be full or partial. The authentication system (130) may be a remote service that interacts by exchanging authorization requests from user devices (110) through the data source (120) to provide access.

The main elements of the authentication system (130) are a data storage (131), authentication access channel assignment module (132), user settings module (133), mobile channel selection and prioritization module (134), user notification module (135) and data source notification module (136). The set of modules may differ for a specific final embodiment, particularly, the notification modules may be optional.

The data store (131) contains basic information to support the authorization process for user devices (110). The module (131) stores data on channels selected by each user device (110) interacting with the system (130), as well as keys/tokens/ID data corresponding to each user device (110) in each mobile channel used for authorization in the past or present.

The storage (131) also stores algorithms, procedures, and logic of authorization and notification for each authorization channel, including, but not limited to, operation timeouts, data delivery confirmation methods, launching rules, re-authentication periods, API calls, and other channel details. The number of channels in the system (130) may exceed the number of channels that a specific data source (120) selected to use for accomplishing its authorization tasks for user devices (110).

The storage (131) contains software logic for managing access keys, particularly, obtaining, storing, and transmitting authorization keys and/or identifiers (depending on the authorization channel) for each data source (120) and each channel selected by the data source (120) for its operation.

Information about all previously authenticated users for each data source (120) is also transmitted to, and stored in the data store (131). This information can be associated with key data stored in the data store (131) from multiple data sources (120) to provide a centralized authentication service.

The storage (131) may also store all authentication events, including all important technical data on such events, e.g. user IDs, time and place, channels, user device types data, etc.

The authentication access channel assignment module (132) provides operations with tokens/keys/identifiers for multiple data sources (120). This module (132) may be implemented, for example, as a cloud service associated with data sources (120). The module (132) is employed to configure authorization channels used on data sources (120).

The mobile authorization channel selection module (133) provides an authorization channel selection for a user device (110). This functionality can be called from either inside or outside the data source (120) perimeter (depending on the form factor used). The module (133) only contains data on mobile authentication channels selected by the data source (120) owner from the set of all mobile channels whose operation logic is available and stored in the storage (131) of the authentication system (130).

The multichannel selection and mobile channel prioritization module (134) provides that authentication channels are selected and ranked based on the rules set by the logic of the module (134). When performing the prescribed functions, the module (134) can use the authentication history of a user device (110) or data on the allowed channels by the data source (120). The channel selection process begins with selecting one channel (of the highest priority) and then alternates through authorization channels until an authentication result is obtained.

The user notification module (135) provides notification to a user device (110) that authentication is currently taking place (may be not applied in every implementation of this disclosure), including the logic of messages about authentication denial or delay, or the need for further confirmation. To function, the logic of this module (135) may require further actions on user devices (110). Most commonly, such further actions are required during authentication of the second access factor.

The data source notification module (136) provides notification to the data source (120) of the authentication result. For example, the module (136) may be implemented based on the OAuth protocol.

Figure 2:
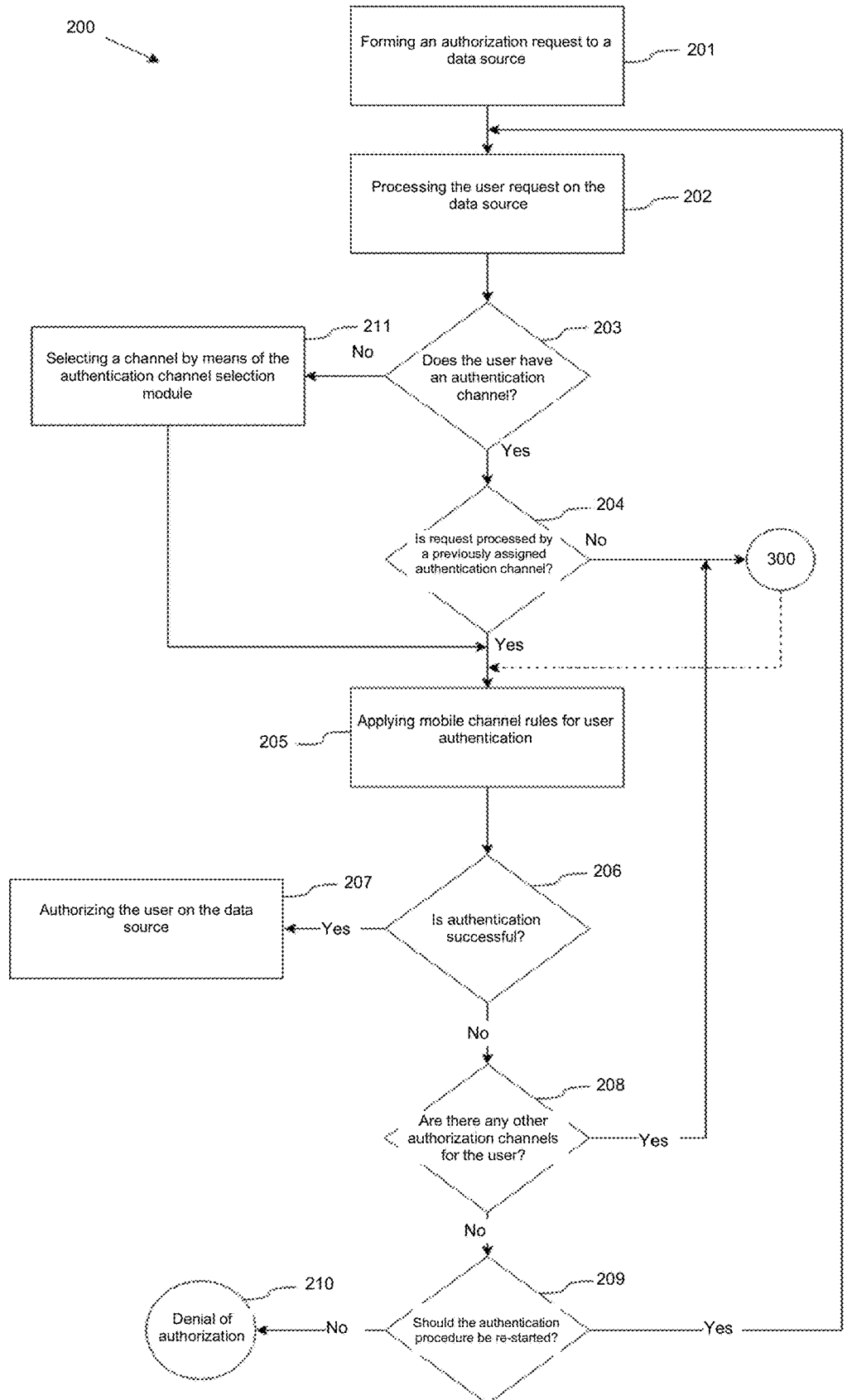
FIG. 2 & FIG. 3 illustrate the methods of user authorization.

FIG. 2 shows a method for authorizing a user device (110) on a data source (120) via a mobile authentication channel. At step (201), a user initiates the authentication process on a data source (120). A request for access to the resource (120) may be initiated, for example, by activating a graphical user interface (GUI) element, such as an icon, widget, etc., on the screen of a device (110) by means of a web browser or software application. At step (202), the request from the user device (110) is transmitted to the data source (120).

Then, at step (202), when received the user request, the resource (120) processes it. The request usually includes at least a user ID or an array of user authorization data (login/password); a user device ID or other types of identifying information may also be further used. At step (203), based on the user IDs received, the data source (120) checks whether the user device (110) has a set mobile authentication channel, by transmitting said identification data to an authentication system (130).

At step (203), the authentication system checks the availability of an authentication channel for the corresponding user device (110) by comparing the data received in the user request to the data stored in the system memory module (131). If the system (130) has no channel stored for the user requesting the authentication process, e.g. it is the first access to the resource (120), then a channel is selected by the module (133)—step 211, and access data are generated for the selected channel and stored in the storage (131) of the system (130) for the corresponding user. In the future, the stored data will be used for next authorization via the selected authentication channel.

At step (204) it is checked if a user authentication request is being processed by means of a previously assigned mobile channel for the current user device (110) associated with the resource (120) to which the authentication request is being made. If a mobile channel has been already assigned and its data have been saved for the current user device (110) and the corresponding data source (120) in the authentication system (130), then the authentication logic and rules inherent in this mobile channel are further implemented—step 205.

For example, a messenger application (Telegram, WhatsApp, Facebook Messenger, Slack, Viber, etc.) can be used as a mobile authentication channel. Each channel has its set user identification logic and the principle of data processing by means of algorithms, e.g. principles for data encryption, packet formation and transmission, notification algorithm, etc.

When the requirements for arranging authentication by using the mobile channel logic are met at step (206), the user is granted access to the resource through their authorization—step 207. The system (130) may further notify the data resource (120) of the fact that the user device (110) has been positively authenticated.

If the authentication procedure fails at step (206), the authentication algorithm logic of the user device (110) can refer to the authentication system (130) one more time at step (208) to analyze additional mobile authentication channels for the current user device (110). If the authentication system has additional mobile channels for authentication of the user device (110), then the authentication process goes to step (300), which will be described below in the application materials.

If there are no additional authentication channels for the user device (110) at step (208), the authentication process can start again—step 209—with repeating the process for the mobile authentication channel currently assigned by the user device (110). Re-authentication may be performed by generating a message, push notification, or other types of notification displayed by the user device (110), in response to which the user device (110) initiates re-authentication on the data source (120). If the repeated authentication procedure is denied, the authentication system (130) informs the resource (120) at step (210) that the user authorization is prohibited.

Figure 3:
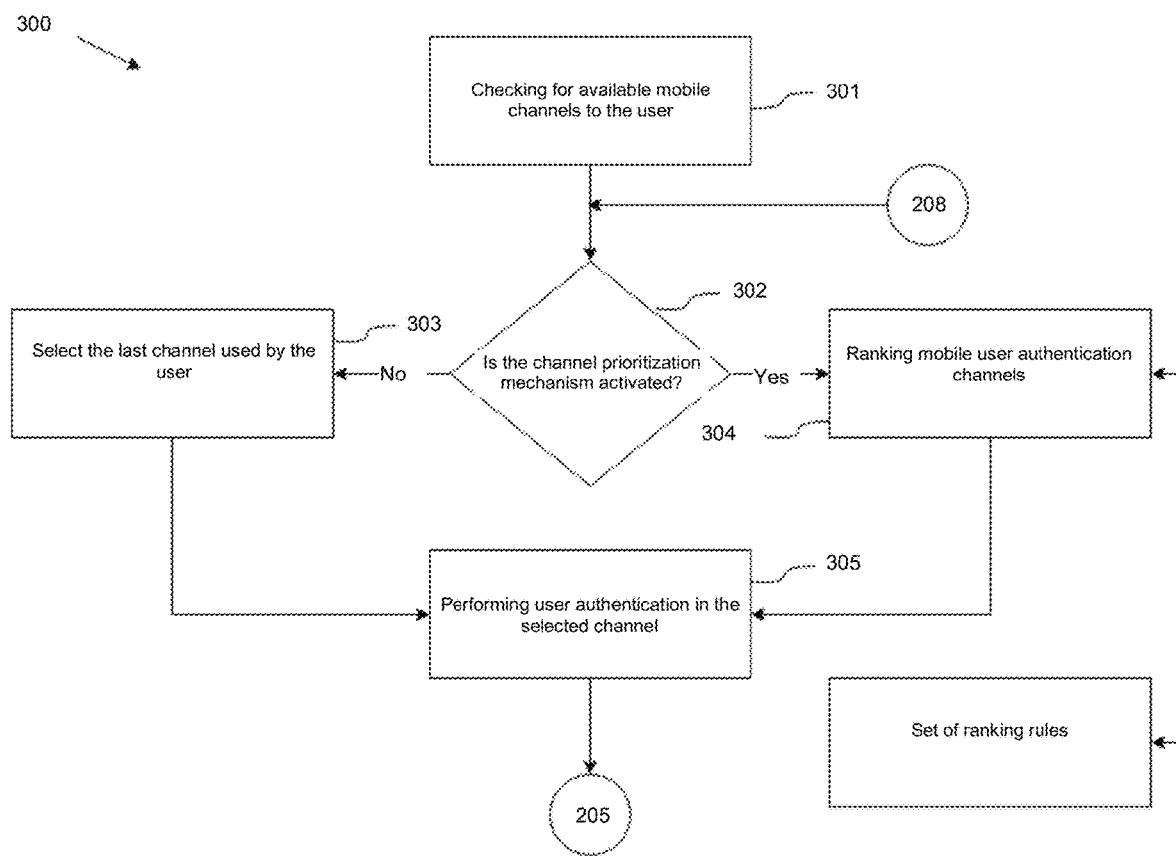

FIG. 3 shows a procedure (300) for selecting a mobile channel for authentication of a user employing a device (110). As mentioned above, mobile channel selection may be carried out when the user employing the device (110) has not assigned a mobile authentication channel for authorization on the selected data source (120) or when the user employing the device (110) has failed to authenticate using a pre-set mobile channel. In this scenario of authentication of the user employing the device (110), an additional mobile channel is assigned for authentication.

At step (301), the available mobile authentication channels to the user device (110) are checked, and information about these channels is located in the authentication system (130). If the user has not yet selected an authentication channel to use on the current data source (120), the authentication system (130) checks all the available authentication channels to the user device (110) as well as the possibility of using the available mobile authentication channels for the current data source (120).

After receiving a list of available mobile channels to the user device (110) for authorization on the current resource (120), it is checked the activation of the mobile channel prioritization mechanism, which is set in the authentication system (130) for the corresponding user device (110), at step (302). If the prioritization mechanism is not activated, then the mobile authentication channel that has been used during the last successful authorization on the current data source (120) is selected for the user device (110) at step (303).

At step (304), with the mobile authentication channel prioritization mechanism activated, the authentication system (130) ranks the available mobile channels to implement the authorization process for the user device (110) on the current data source (120). The prioritization rules can consist of 1 . . . N number of rules, particularly, rules specifying how to select the primary (priority) and subsequent channels, how to sequence the use of mobile authentication channels, etc.

Each data source (120) may have differently configured authentication rules. The priorities may include, but are not limited to, the costs of using the channel, preferences of the data source (120), user authorization history, user response rate to the channel, channel availability at the user location, etc. Based on the channel priority, an authentication channel of the highest priority is selected, and a sequence for using authentication channels further is formed in case of a repeated authentication procedure.

As an illustration of employing the mechanism for ranking authentication channels, let's consider an example, wherein the system (130) defines a range of metrics for selecting the most relevant channel to use for authentication. Particularly, the parameters for processing the ranking algorithm may be user location (roaming, availability of 3G/4G networks), mobile provider conditions (free access to messengers, social networks, etc.), data transmission costs for each type of mobile channels (SMS, the Internet). Based on these metrics, parameters inherent in a particular mobile channel are processed by the algorithm of the prioritization module (134) in the authentication system (130).

Next, at step (305), the authentication logic is used for the mobile channel selected at steps (303) and (304) with the corresponding bunch of identification data (ID/tokens, etc.) of the user device (110) for the selected channel stored in the system (130). After processing the data, the sequence of actions described above for step (205) is performed at step (305).

At step (208), in the case of unsuccessful authentication of the user device (110) by using a set channel authentication or one channel selected from a set of available authentication channels, the authentication method performs the procedure from step (301). If a mobile authentication channel has already been selected by the channel selection mechanism of the system (130), then the authentication parameters for the next priority channel are used.

The authentication system (130) also may check the authorization cycle, e.g. its duration in a given period, the number of iterations, until a positive/negative result is obtained. In this case, the embodiment has a mechanism for setting and storing these settings to apply them after checking the last available channel.

The resource (120) grants access to the user device (110) in a way that is applicable for a particular embodiment. For example, if a user device (110) requests authorization on a resource (120) via a desktop browser, then the user is allowed to access the data source (120) after mobile confirmation. If a user device (110) requests authorization on the mobile version of a resource (120), then immediate (seamless) access can be granted.

For the user device (110) authentication process, user verification in the mobile access channel may be further applied, e.g. two-factor authentication (2FA). At step (205), a policy inherent in each of the channels is set for performing the user verification procedure, based on the received request for access to the resource (120). If 2FA is applied, a 2FA execution method to be used by the corresponding mobile channel is determined, e.g. entering a code (PIN code, code from an electronic message, etc.), entering characters/words, using an electronic digital signature, entering the user signature on the screen of a device (110), biometric identification (fingerprint, retinal scan, voice input, user images, vein pattern, etc.), the fact of viewing the message (push messages), a graphic code (QR code, bar code, etc.), time for message processing, interaction with graphical interface elements, etc. Various principles known from the prior art can be applied to confirm access of the user device (110) to the selected data channel.

When transmitting a user request to the authentication system (130), one or more encryption algorithms, such as RSA, SHA-256, etc., can be applied to the request. This approach provides additional protection when exchanging information packets containing identification data for a user device (110) and data for performing the authentication procedure in the user channel.

Figure 4A:
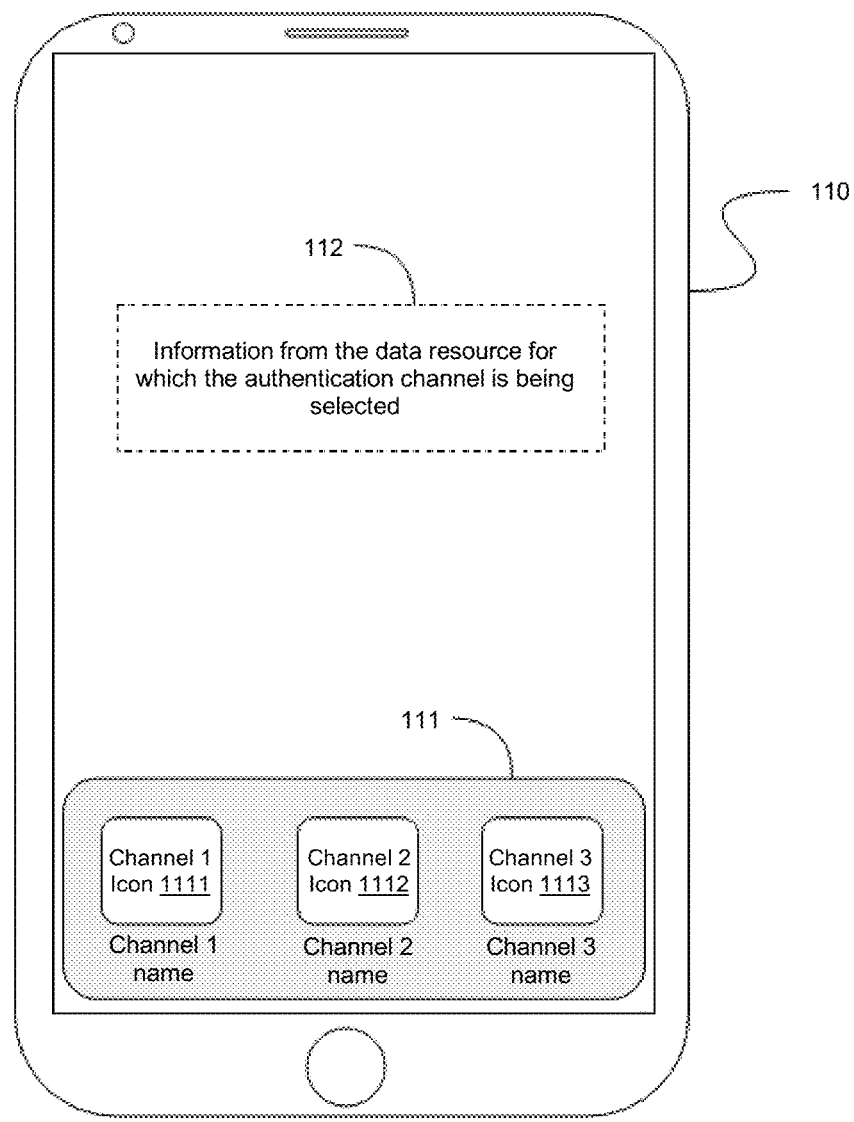
FIG. 4A to FIG. 4D illustrate examples of selecting a mobile authentication channel on a user device by using its graphical user interface.

FIG. 4A shows an example of selecting authentication channels by using the GUI of a user device (110). The user device (110) interface comprises an area (112) for displaying information about the data source and an area (111) for icons (1111) to (1113) of mobile channels. The area (111) may be a pop-up window or a widget. When the selected icon of the access channel is activated, it is performed a procedure for associating the selected authentication channel with the current data source or, for example, a resource associated with this icon.

Figure 4B:
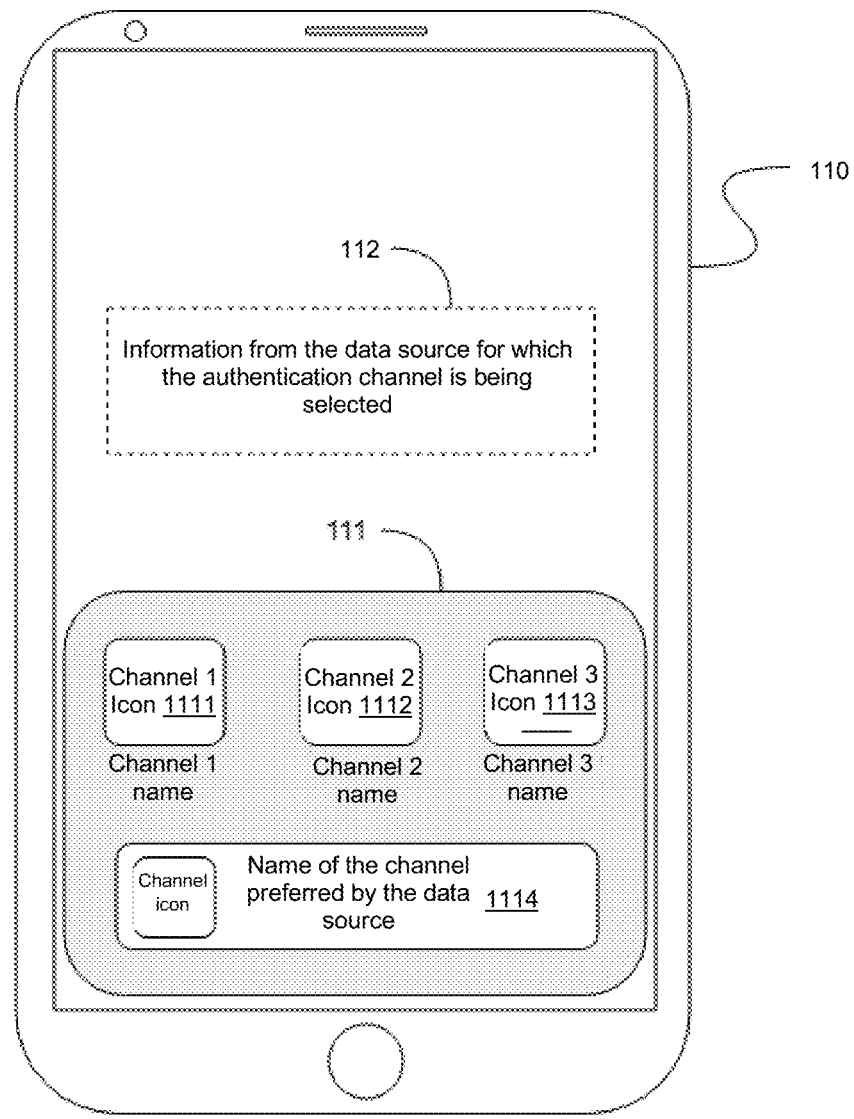

FIG. 4B illustrates an example with the display of channel options for user authentication, wherein in addition to the icons (1111) to (1113), the most preferred authentication channel (1114) for the current data source (120) can also be displayed. The icon or button for selecting the channel (1114) can be displayed either automatically when accessing the resource (120) or when certain specified conditions are met, for example, after a certain period, activation of the channel prioritization mechanism, etc.

Figure 4C:
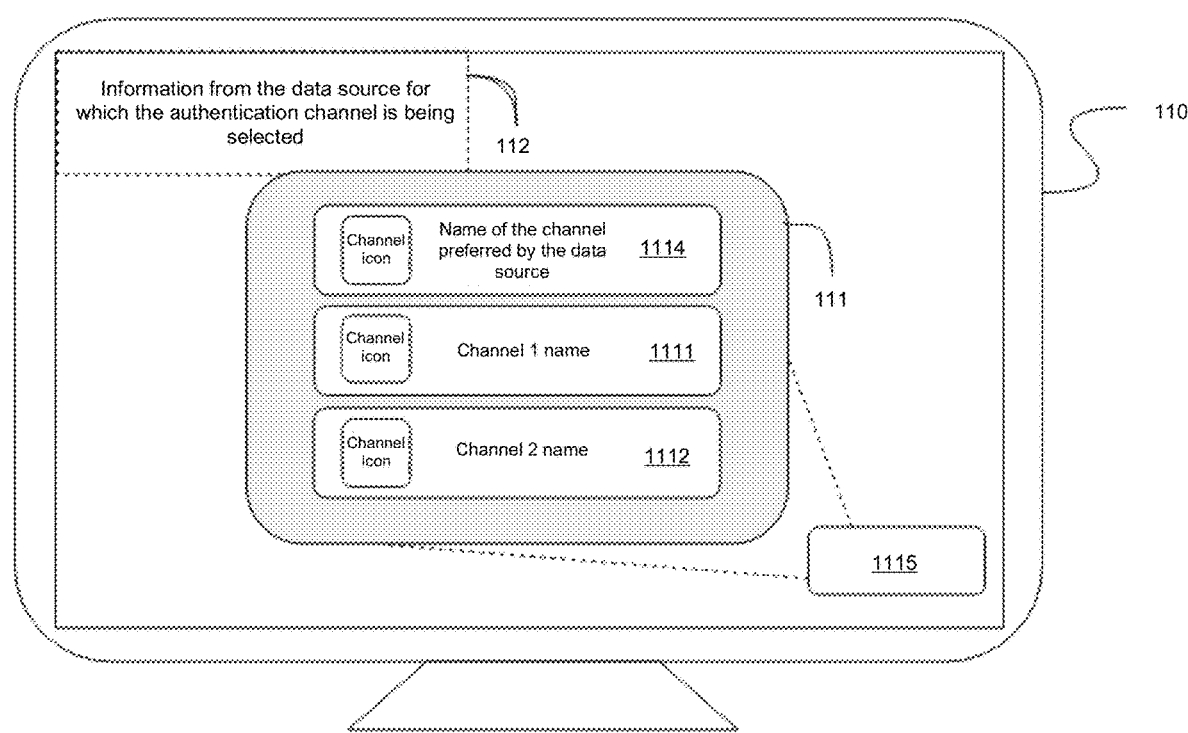

FIG. 4C shows an example of displaying a desktop version of a device (110), such as a personal computer, laptop, or all-in-one machine, in which the user can request authentication using mobile channels. In this case, the channel is selected by using the logic of primarily mobile channels having a link with the desktop in the form of installed applications or plugins, or a link to the selection is delivered to a mobile user device by any acceptable method, such as a text message, push, e-mail, etc. The interface window (111) displays both possible options for selecting authentication channels (1111) to (1112) and preferred channels (1114). The element (1115) is an interface element that can be used to call the list of mobile channel icons (1111) to (1113).

Figure 4D:
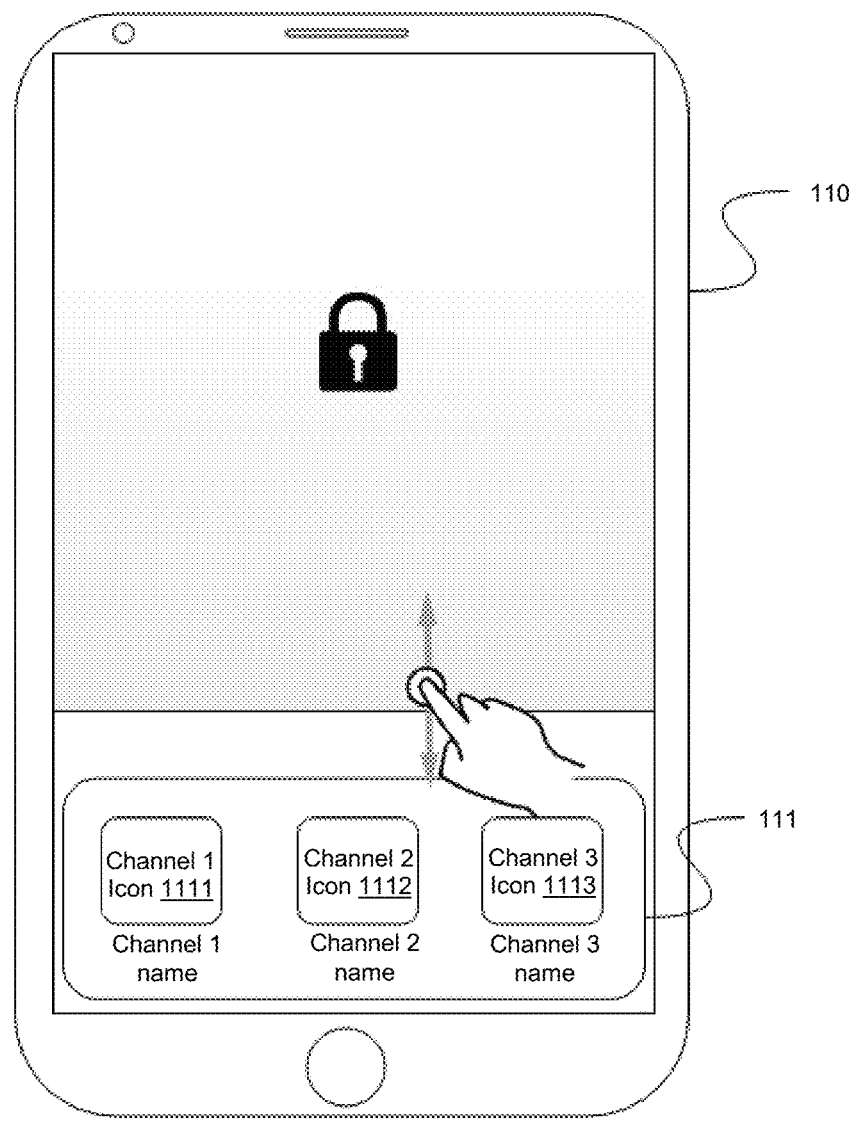

FIG. 4D shows an example of selecting an authentication channel when a user device (110) is locked. The area (111) with the channel icons (1111) to (1113) can be called by interacting with the display of the device (110), for example, by swiping from the bottom edge of the screen. It should be obvious to those skilled in the art that other options for interacting with the device (110) GUI can be used in any possible directions available through employing the logic of the interface or operating system, shell, launcher, etc.

Figure 5A:
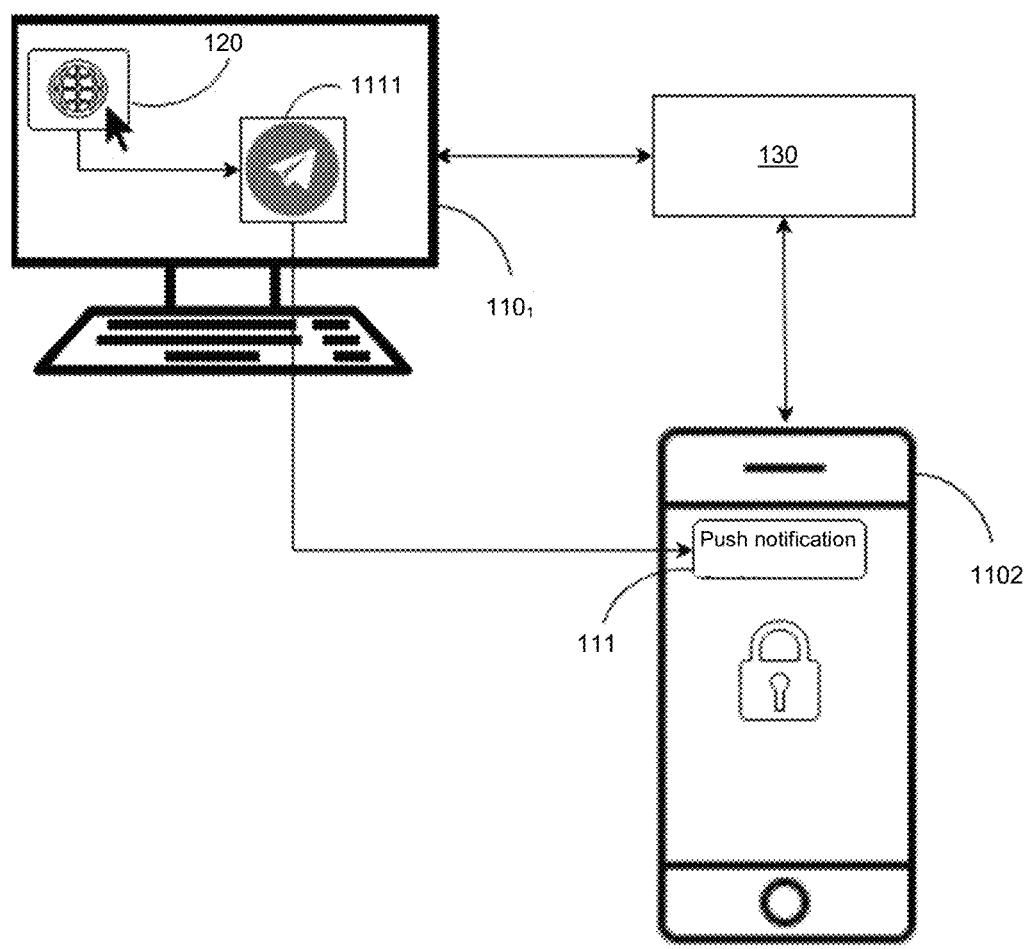
FIG. 5A to FIG. 5D illustrate examples of authentication with two-factor verification.
Figure 5B:
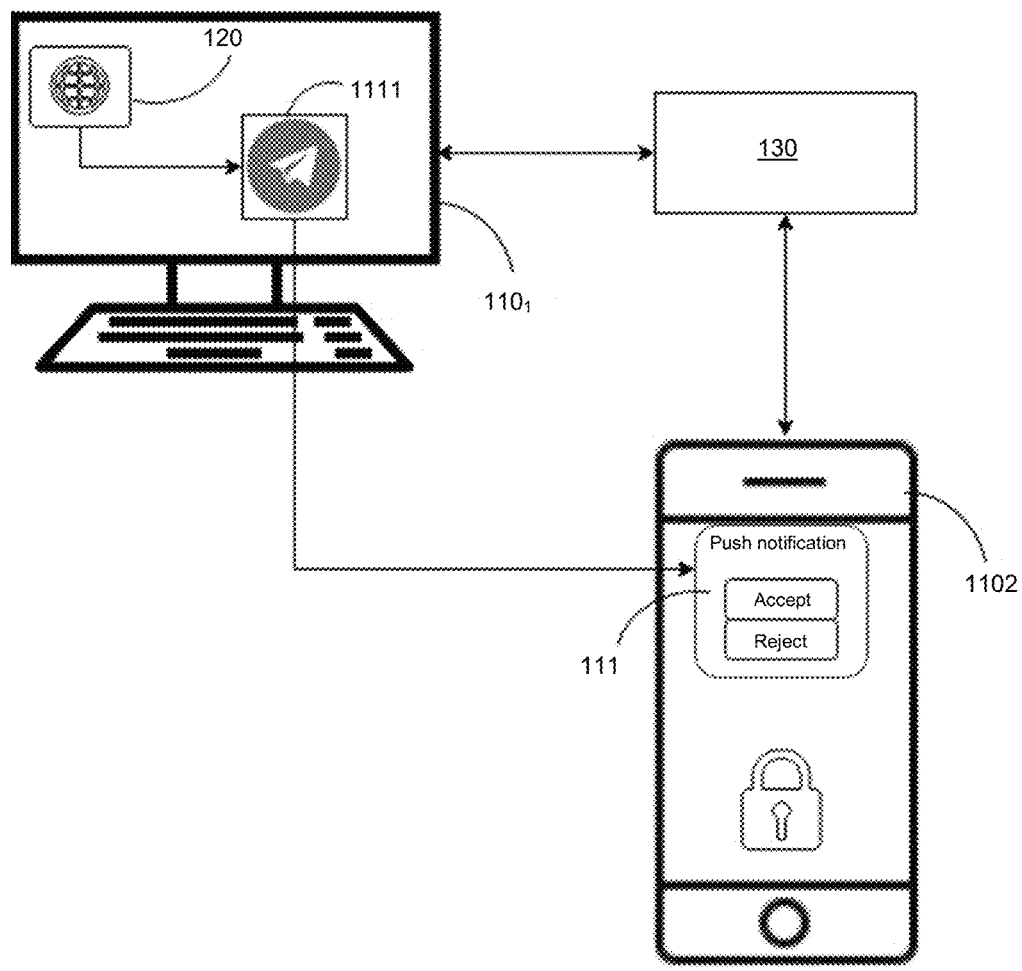

FIG. 5A & FIG. 5B illustrate an example of the platform using two-factor verification between two devices ($110_1$) & ($110_2$), in the case where one of the devices is locked. Where it is necessary to use the first device ($110_1$) for authentication on the data source (120), if there is an assigned access channel for the resource (120), or if the user has several available channels for the authentication process on said resource (120), then a request for user authentication on the resource (120) can be sent to the device ($110_2$), which may be locked. In this case, the notification of arrival in the selected mobile authentication channel may be displayed as a push notification (111), which also comes to the corresponding user-selected mobile authentication channel (1111). The push notification (111) received may be activated, particularly, when interacting with an interface element that displays this notification, and this will be a confirmation of user authentication by means of the device ($110_2$). The confirmation may be any interaction with the push notification area (111). If the confirmation of the notification (111) does not occur at the specified time, then authentication is deemed unperformed, and either another authentication channel will be selected or granting access will be prohibited.

At the same time, a partial authentication confirmation option can be used, wherein the system (130) receives a notification of viewing the push notification, from a mobile authentication channel on the device ($110_2$). In this case, authentication can also be deemed performed. The term "viewing" also means receiving a response from the user device ($110_2$) confirming that the user has seen the push notification (111), for example, by receiving data from mobile device ($110_2$) sensors, such as a camera, gyroscope, proximity sensor, etc. By itself, the push notification (111) may also be purely informational in nature and not require any further activity by the user.

When a confirmation is sent as a push notification from another device, one of the particular examples of confirming the authentication of a user device ($110_2$) may be entering information in the field (111) by means of text input using a text string generated by the GUI when interacting with the push notification area (111).

FIG. 5B shows an example of interaction with the area (111), for example, using a swipe with the display of options for confirming or rejecting authentication. Additionally, there may be an option with entering a set mobile authentication channel, such as Telegram or other messenger, which will provide options for performing or rejecting authentication, on the device ($110_2$). An example of such an application is the known solution LoginTap.

In various embodiments, the authentication process using a device (110) equipped with a biometric sensor in the display area may be implemented by transferring an icon with a mobile authentication channel to the biometric sensor area via the operating system GUI to confirm the user's selection by means of biometric verification.

Figure 5C:
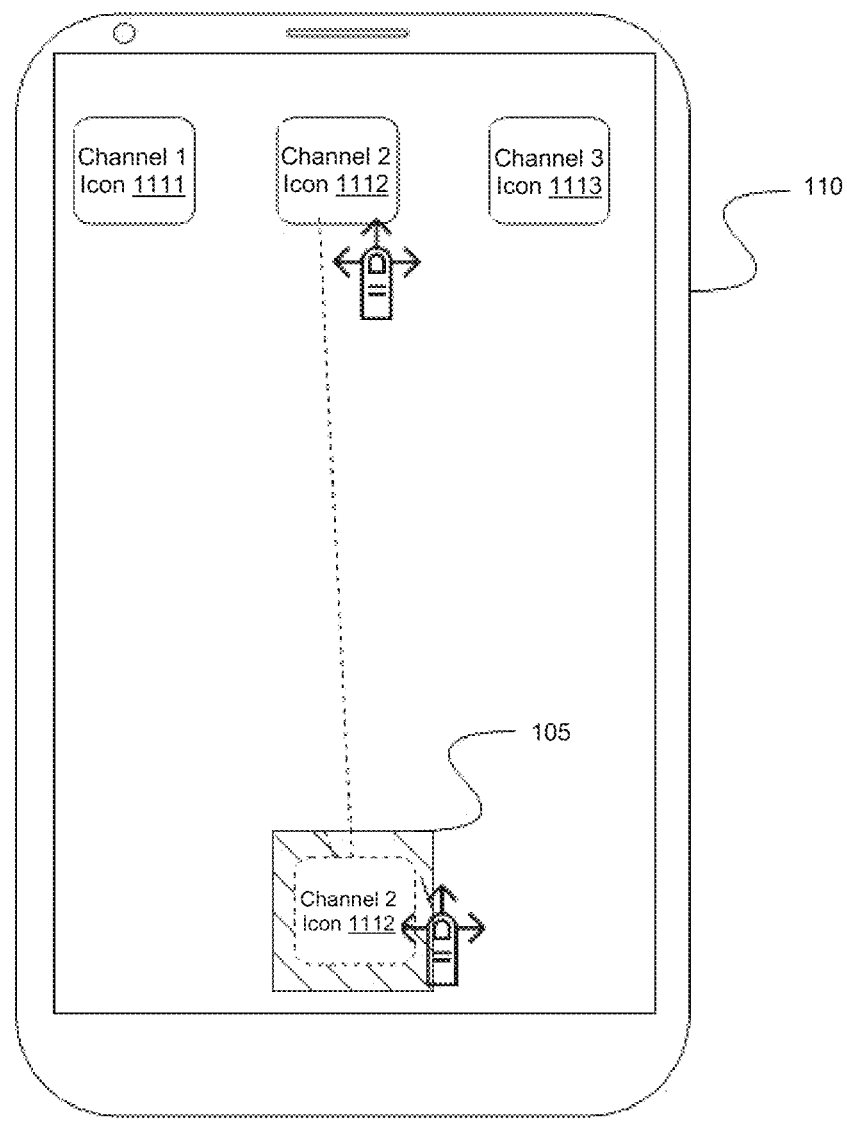

FIG. 5C shows an example of two-factor verification of a user device (110) by moving the icon (1112) of the selected authentication channel to the area of the biometric sensor (105) located in the display area of the device (110). In such an embodiment, a user is authenticated with recognizing the presence of the user's finger with a captured GUI element in the form of a channel icon (1112) in the sensor area (105), which provides further verification and access protection.

Figure 5D:
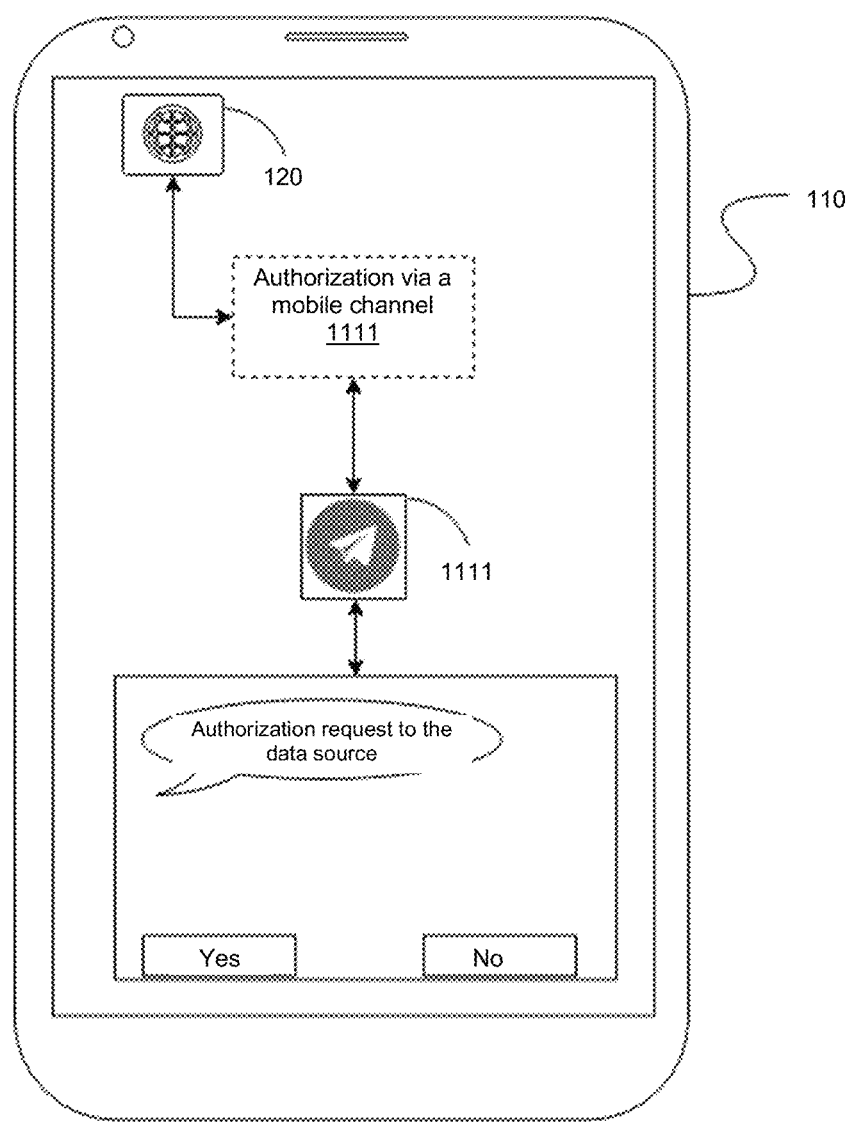

FIG. 5D shows an example of authentication using two-factor authentication performed on a user device (110). When an access request to a resource (120), such as a website or application (installed on a device (110) or a web application, etc.) is made from a device (110), a confirmation may be sent to an available mobile channel (1111), such as Telegram, on the same device (110). The mobile channel (1111) may display a notification, for example, in the form of a chat session request, with options for confirming or rejecting the authentication process. When the request is confirmed in the channel (1111), the authentication parameters are transmitted to the data source (120) (or to the authentication system (130)) for execution followed by granting access to the resource (120) by using the device (110).

FIG. 5D shows an alternative case of two-factor authentication on a device (110) when requesting access to a resource (120). This may be the fact of confirming authentication in another mobile channel that receives a user authentication request from the authentication system (130) in the case where the first mobile channel (1111), which initially received a request from the resource (120), has not performed authentication. Such a case may occur if an error occurs during user authentication by means of the first channel (1111), for example, due to the expiry of the response time from the first authentication channel, technical communication problems, inadequate transmission of identification information (keys/tokens, etc.) from the first channel, etc. In this case, access to the resource (120) will be granted upon receipt of a user confirmation from the second authentication channel. For example, when the resource (120) sent the first request to Telegram, if user identification information was not fully or partially received from this channel, then the authentication request is redirected further to the second available mobile channel to the user, e.g. WhatsApp, where the confirming information is transmitted to the data source (120) for user authorization during the access confirmation procedure.

In one particular application of the claimed disclosure, when using externally isolated in-house networks, e.g. an Intranet type network, a corresponding mobile authentication channel may be assigned to each employee for each device accessing one or more resources. Such a solution can be implemented by using appropriate settings of user IDs, devices, resources, and access channels. Further, with the help of such an implementation, an information loop can be formed to grant access, for example, to one data source through a linked application, through which participants of said loop are authenticated.

Figure 6:
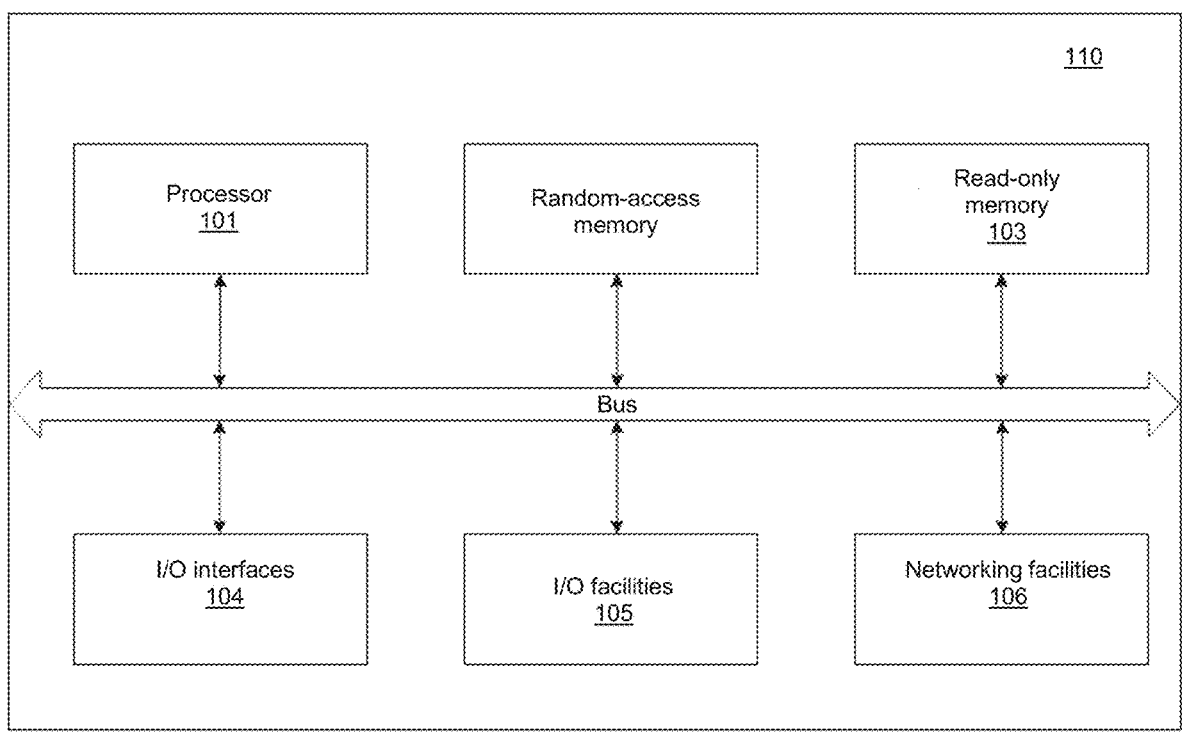
FIG. 6 illustrates a general layout of a user device.

FIG. 6 shows an example of the implementation of a user device (110). As indicated above, the device (110) may be generally selected from a wide list of electronic devices known from the prior art. Generally speaking, a device (110) may comprise one or more processors (101) or microcontrollers, RAM (102), a persistence unit (103), input/output interfaces (104), input/output devices (105), a networking facility (106).

Processor (101) is the main computing module that provides logical processing of algorithmic commands necessary for the device (110) to perform the necessary functions.

RAM (102) is a standard random-access memory that is used to store instructions executed on the processor to implement the operation of the embedded program logic.

Persistence units (103) may include, but not limited to, a hard disk drive (HDD), flash-memory (NAND, EEPROM, SD-cards, etc.), solid-state drive (SSD), optical disk storage (CD/DVD/BlueRay disks, etc.).

I/O interfaces (104) may include, but not limited to, ADC/DAC, USB (micro-, Type C, mini-, etc.), PS/2, PCI, VGA, RS232, RJ45, FireWire, SATA, IDE, COM, LPT, Audio Jack, HDMI, Display Port, Lightning, etc.

I/O facilities (105) may include, but not limited to, a display, touch screen, keyboard (mechanical, touch-sensitive, projection, etc.), trackball, joystick, touch pad, speaker, microphone, projector, indicator lamp, buzzer, biometric sensor (fingerprint, retina, iris, voice, palm, vein pattern scanners and the like), camera, optical sensor, accelerometer, gyroscope, light sensor, proximity sensor, gravisensor, etc.

Networking facility (106) may include, but not limited to, a Bluetooth module, BLE module, NFC, Ethernet card, modem, router, IrDa, GSM modem, GPRS modem, LTE modem, 5G modem, WLAN, Wi-Fi module, satellite modem, GNSS receiver, etc.

The given description of the claimed disclosure identifies only the preferred embodiments and shall not be construed as limiting other, particular embodiments within the scope of the claimed legal protection that shall be familiar to a person skilled in the art.

The invention claimed is:

1. A user authorization system comprising a user device associated with a data source via a data channel, while the data source is associated with an authentication system, in which there are:
   the user device configured to form an authorization request to the data source, wherein the authorization request contains at least information identifying the user;
   the data source configured to receive the user authorization request and transmit the corresponding request to the authentication system, wherein the authentication system contains data on available mobile channels for authorization at each data source and stores user authorization data for each available mobile channel, where the mobile channel is an application installed on the user device and each mobile channel uses its own authorization algorithm; and
   the authentication system provides user authorization on said resource via at least one mobile channel associated with the user device, wherein the authentication system checks available mobile channels for the user and prioritizes mobile channels to choose a mobile channel with highest priority, which handles the authorization request for user authorization via the user device.

2. The system according to claim 1, wherein the authorization request is encrypted on the user device and decrypted in the authentication system.

3. The system according to claim 1, wherein the user is authorized by using further verification selected from the group: biometric verification, a PIN code, graphic code, sound code, or a combination of them.

4. The system according to claim 1, wherein the data channel is selected from the group: the Internet, Intranet, LAN, Ethernet, TCP/IP, WAN, WLAN, MAN, CAN, SAN, PAN, Wi-Fi, Wi-Fi Direct, LPWAN, GSM, GPRS, LTE, 5G, Bluetooth, BLE, IrDA, NFC, satellite communication, or a combination of them.

5. The system according to claim 1, wherein the resource is a website or a software application.

6. A method for authorizing a user on a data source via a mobile channel, comprising the following steps:

forming a resource access request by using a user device, which contains user authorization data, wherein the mobile channel is an application installed on the user device and each mobile channel uses its own authorization algorithm;

transferring said resource access request to an authentication system associated with said resource, wherein the authentication system contains data on available authorization channels for each data source and stores user authorization data for each available mobile channel;

the authentication system after receiving the resource access request checks available mobile channels for the user;

compares the user authorization data from the received request for the selected mobile channel to the access data stored in the authentication system;

prioritizes mobile channels;

chooses a mobile channel with highest priority;

authorizes the user via the user device in the mobile channel with highest priority.

7. The system according to claim 6, wherein the user authorization data includes at least a user ID on the data source in the selected mobile channel.

8. The system according to claim 7, wherein the authorization request is encrypted on the user device.

9. The system according to claim 6, wherein at least one mobile channel for authorization on the data source is set for each user in the authentication system.

10. A method for authorizing a user on a data source via a data channel, comprising the following steps:

forming a resource access request by using a user device, which contains user authorization data;

transferring said resource access request to an authentication system associated with said resource, wherein the authentication system contains data on available mobile channels for authorization at each data source and stores user authorization data for an each available mobile channel;

checking the availability of one or more mobile authorization channels for said user in the authentication system by comparing the user authorization data to the data stored in the authentication system, wherein the authentication system prioritizes mobile channels for choosing a mobile channel with the highest priority;

sending an access confirmation request to the mobile authorization channel with highest priority chosen for the user, wherein the mobile channel is an application installed on the user device and each mobile channel uses its own authorization algorithm;

confirming access via the mobile channel on the user device, which received the request from the authentication system, or receiving a negative confirmation of an unauthorized access in said mobile channel; and authorizing the user on a said resource in case of a successful confirmation of the access request or denying the access in case of a negative confirmation of the access request.

11. The system according to claim 10, wherein a confirmation policy for a mobile channel is used for the access confirmation request.

12. The system according to claim 11, wherein the confirmation policy is selected from time interval or message receipt confirmation.

13. The system according to claim 12, wherein the authentication system alternates a request to another available mobile authorization channel if the set confirmation policy is not fulfilled based on a channel priority.

* * * * *